United States Patent [19]
Ohno

[11] Patent Number: 5,587,844
[45] Date of Patent: Dec. 24, 1996

[54] ALBADA TYPE INVERTED GALILEAN FINDER FOR CAMERA

[75] Inventor: Kazunori Ohno, Saitama-ken, Japan

[73] Assignee: Fuji Photo Optical Co., Ltd., Saitama-ken, Japan

[21] Appl. No.: 305,433

[22] Filed: Sep. 13, 1994

[30] Foreign Application Priority Data

Sep. 21, 1993 [JP] Japan ............................. 5-257766

[51] Int. Cl.⁶ ........................... G02B 13/18; G03B 13/02; G03B 13/08
[52] U.S. Cl. ........................ 359/717; 359/646; 396/373; 396/386
[58] Field of Search ..................... 359/744, 717, 359/646; 354/219, 220, 224, 225

[56] References Cited

U.S. PATENT DOCUMENTS

| | | | |
|---|---|---|---|
| 4,429,978 | 2/1984 | Ikari | 359/644 |
| 4,650,293 | 3/1987 | Kimura et al. | 359/708 |
| 4,828,374 | 5/1989 | Ishisaka et al. | 359/715 |
| 5,353,158 | 10/1994 | Matsuo | 359/715 |

FOREIGN PATENT DOCUMENTS 59-168738  11/1984  Japan .

*Primary Examiner*—Scott J. Sugarman
*Attorney, Agent, or Firm*—Young & Thompson

[57] ABSTRACT

An Albada type inverted Galilean finder for a camera has an objective lens of negative power having a concave surface on a pupil side opposite an object side which is provided thereon with a half mirror coating and an eyepiece having a convex surface on the pupil side and a surface on the object side which is provided thereon with a framing marking defining an area for framing.

5 Claims, 4 Drawing Sheets

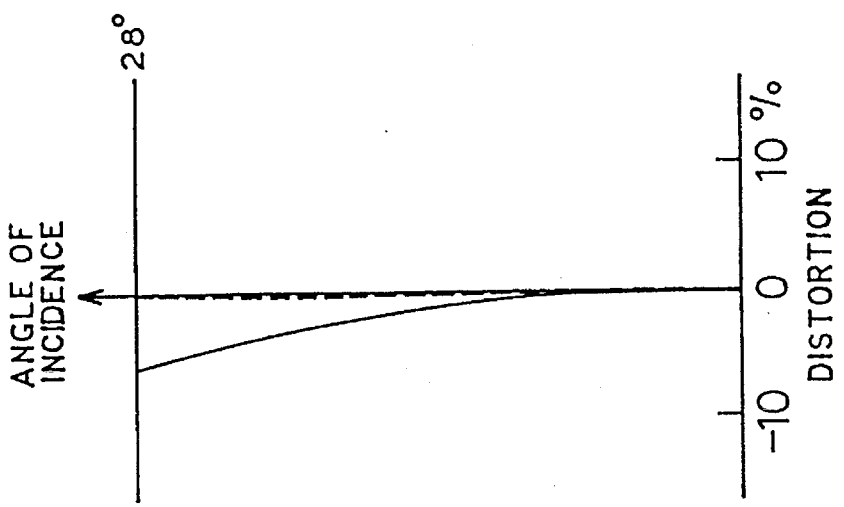
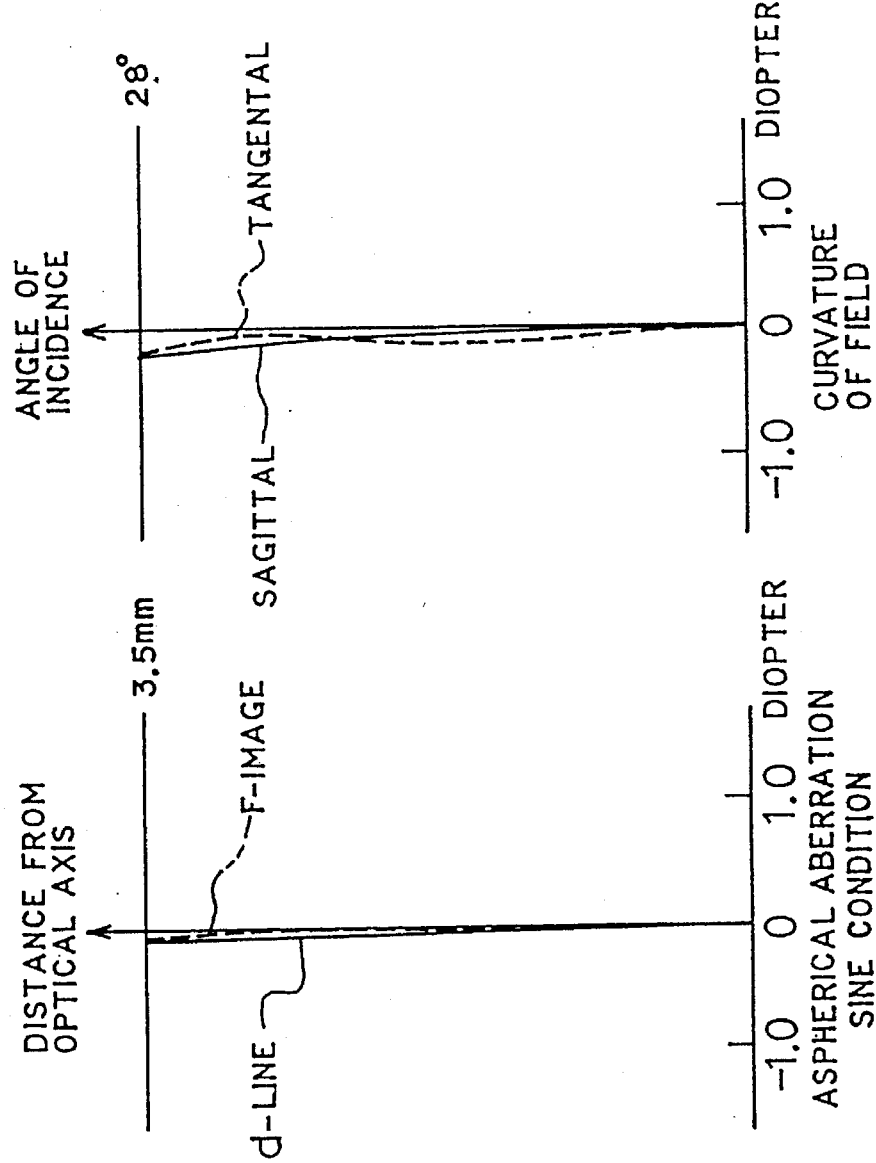
FIG. 2A  FIG. 2B  FIG. 2C

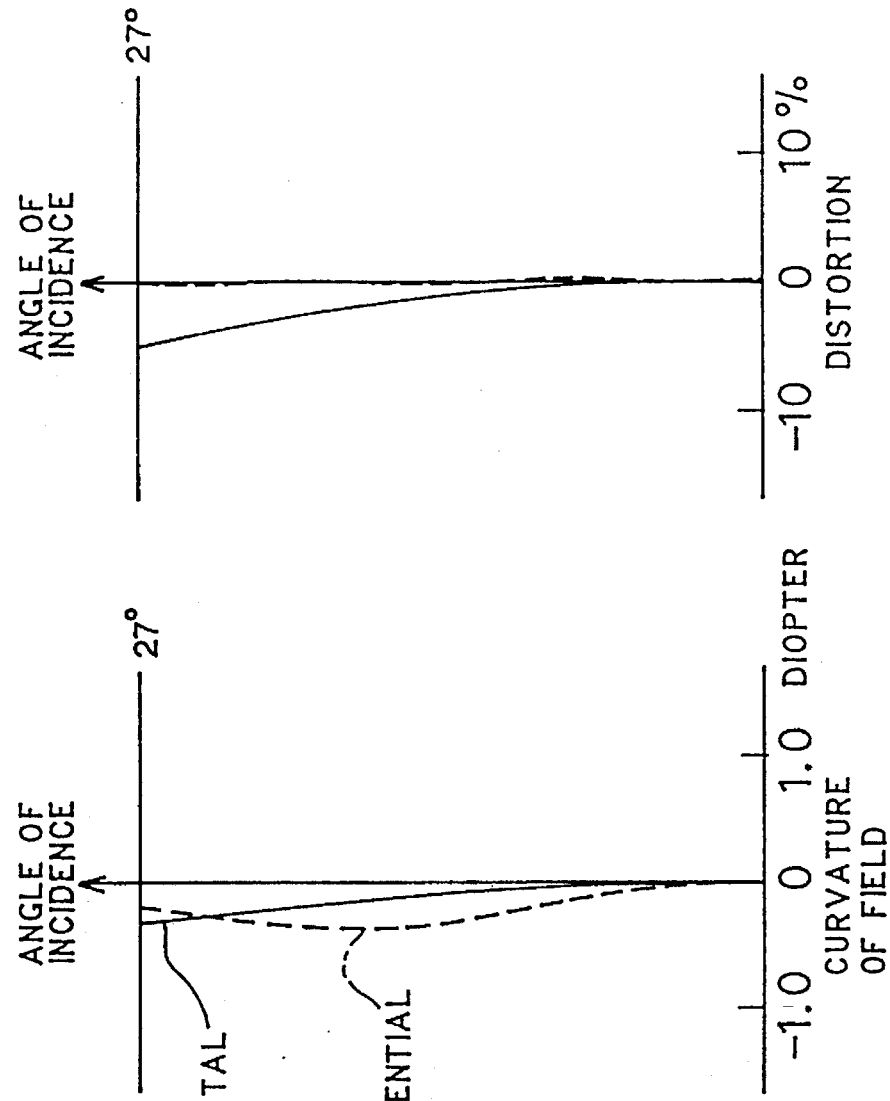

ALBADA TYPE INVERTED GALILEAN FINDER FOR CAMERA

BACKGROUND OF THE INVENTION

1. Field of the invention

The resent invention relates to an Albada type inverted Galilean finder for a photographic camera and, more particularly, to an Albada type inverted Galilean finder which includes a frame projection optical system.

2. Description of Related Art

Modern compact cameras, widely used for nonprofessional purpose, are typically equipped with various automatic features, such as automatic exposure, automatic focusing, automatic film winding, low luminance flash exposure, etc. Such an automatic compact camera provides various opportunity of taking pictures with ease for amateur photographers. These automatic compact cameras of the middle class are typically equipped with Albada type inverted Galilean finders.

The Albada type Galilean finder typically has a finder lens system including an objective lens element, an eyepiece element formed with framing markings on one surface facing the objective lens element, and a half mirror disposed between the objective lens element and the eyepiece element for projecting the framing markings. Increasing of the magnification of the finder lens system renders the finder increased in its overall length and is undesirable for minimized or downsized photographic cameras. For this reason, most compact cameras are typically equipped with finders whose finder lens systems have magnifications of 0.4 to 0.5.

One of recent strong demands on compact cameras is, in addition to be easy-to-view, to be small, thin and lightweight and to be manufactured at low cost. In an attempt to minimize Albada type inverted Galilean finders and provide them with clear view, it has been the main stream to constitute finder lens systems having two lens elements and provide large magnifications for the finder lens systems. Such a finder lens system makes it difficult to incorporate the finder in a camera with remaining the camera remained small and thin. Further, a large magnification of the finder lens system needs to use thick lens elements, hindering providing a lightweight camera.

SUMMARY OF THE INVENTION

It is an object of the present invention to provide an Albada type inverted Galilean finder having a finder lens system with an decreased number of lens elements which has a large magnification without increasing the thickness of each lens element sufficiently for providing clear view.

It is another object of the present invention to provide an Albada type inverted Galilean finder having a finder lens system which is decreased in overall length so as to enables a camera to be minimized and be manufactured at low cost.

The foregoing objects of the present invention are accomplished by providing a finder lens system for an Albada type inverted Galilean finder comprising from the object side a bi-concave objective lens element of negative power and a convex eyepiece having a convex surface on the side opposite to the object side and satisfying the following conditions:

(1) $4.0 < f_2/L < 7.0$
(2) $2.0 < R_2/d_2 < 2.7$
(3) $0.5 < R_2/|R_4| < 2.7$ where L is the overall length of the finder lens system;

$R_2$ is the radius of a surface of the objective lens element on the side opposite the object side at the optical axis;

$R_4$ is the radius of a surface of the eyepiece on the side opposite the object side at the optical axis;

$f_2$ is the focal length of the eyepiece element; and $d_2$ is the axial distance between the objective lens element and the eyepiece element.

Specifically, the objective lens element has a concave surface on the pupil side opposite the object side of the finder lens system which is provided with a half mirror coating formed by, for instance, vapor vacuum deposition. The convex eyepiece element has a steep convex surface on the pupil side and a surface, which may be a plano-convex lens element, on the object side formed as a reticle including a rectangular framing marking or framing markings for defining a rectangular framing area and, if necessary, a target marking at the center of the rectangular framing area for defining a focusing area. These markings, which may be formed as metal coatings provided by vacuum vapor deposition, are reflected by the half mirror surface of the objective lens element and seen against a background of scene through the eyepiece element.

The condition (1), which defines the magnification of finder lens system. If the under limit is exceeded, it will be difficult to place the reticle on the surface of the eyepiece element on the object side and to provide a sufficiently large magnification for the Albada type inverted Galilean finder. On the other hand, if the upper limit is exceeded, it will be difficult to provide an axial distance between the objective lens element and the eyepiece element which is essential to permit the objective lens element to have the concave surface of sufficiently large radius on the side opposite the object side for forming an Albada type finder lens system. Further, decreasing the powers of the objective lens element and/or the eyepiece element for a fixed axial distance between the objective lens element and the eyepiece element provides an increase in effective aperture of each lens element, so as to make the finder lens system bulk.

The conditions (2) and (3) define shapes of the two lens elements and the axial distance between the two lens elements essential for the Albada type inverted Galilean finder lens system. If the under limits are exceeded, the reticle surface including the framing marking and the focus target marking should be placed far on the object side from the surface of the eyepiece element on the object side. Conversely, if the upper limits are exceeded, the reticle surface including the framing marking and the focus target marking should be placed on the pupil side relative to the surface of the eyepiece element on the object side. In any above instance, a special reticle element must be provided separately from the surface of the eyepiece element. For the sake of argument, in the case of granting that the reticle markings may be formed on the surface of the eyepiece element on the pupil side, a special transparent cover plate is necessary to be placed for protecting the eyepiece element against foreign substance and damages. The provision of such a special optical part increases the number of parts for the finder lens system of Albada type inverted Galilean finder.

The finder lens system of Albada type inverted Galilean finder of the present invention may preferably have aspherical surfaces, one on each of the two lens elements so as to make the whole structure of Albada type inverted Galilean finder compact and light.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 2A–2C are diagrammatic views showing various aberrations of the finder lens system in accordance with a preferred embodiment of the present invention;

FIGS. 4A–4C are diagrammatic views showing various aberrations of the finder lens system in accordance with still another preferred embodiment of the present invention.

DETAILED DESCRIPTION OF THE PREFERRED EMBODIMENTS

Figure 1:
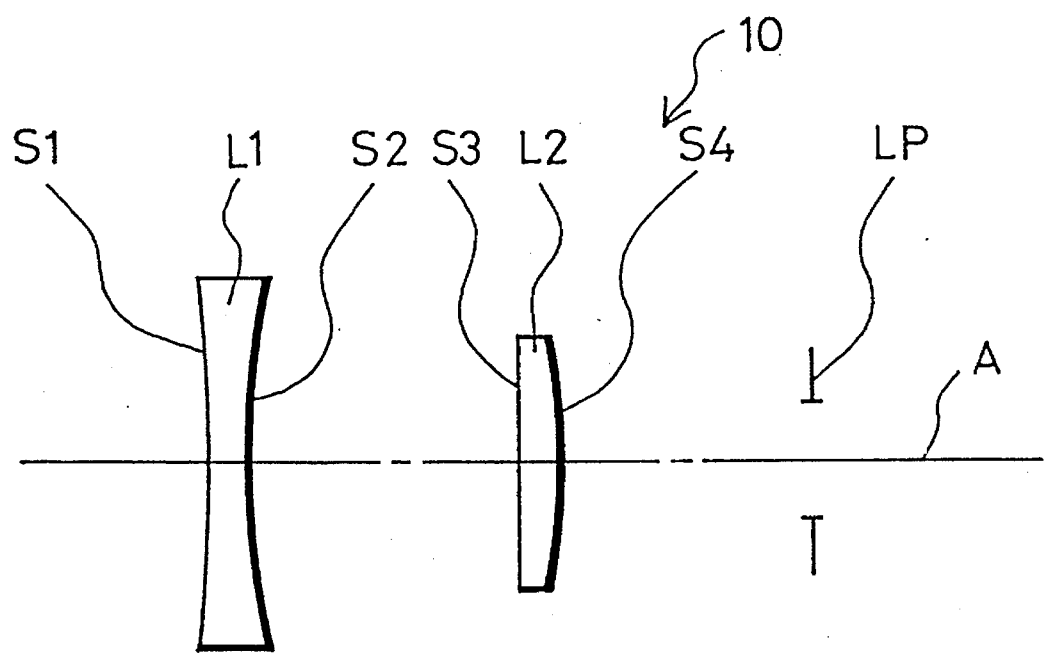
FIG. 1 is a schematic diagrammatic view of the lens system of an Albada type inverted Galilean finder of the present invention.
Figure 3A:
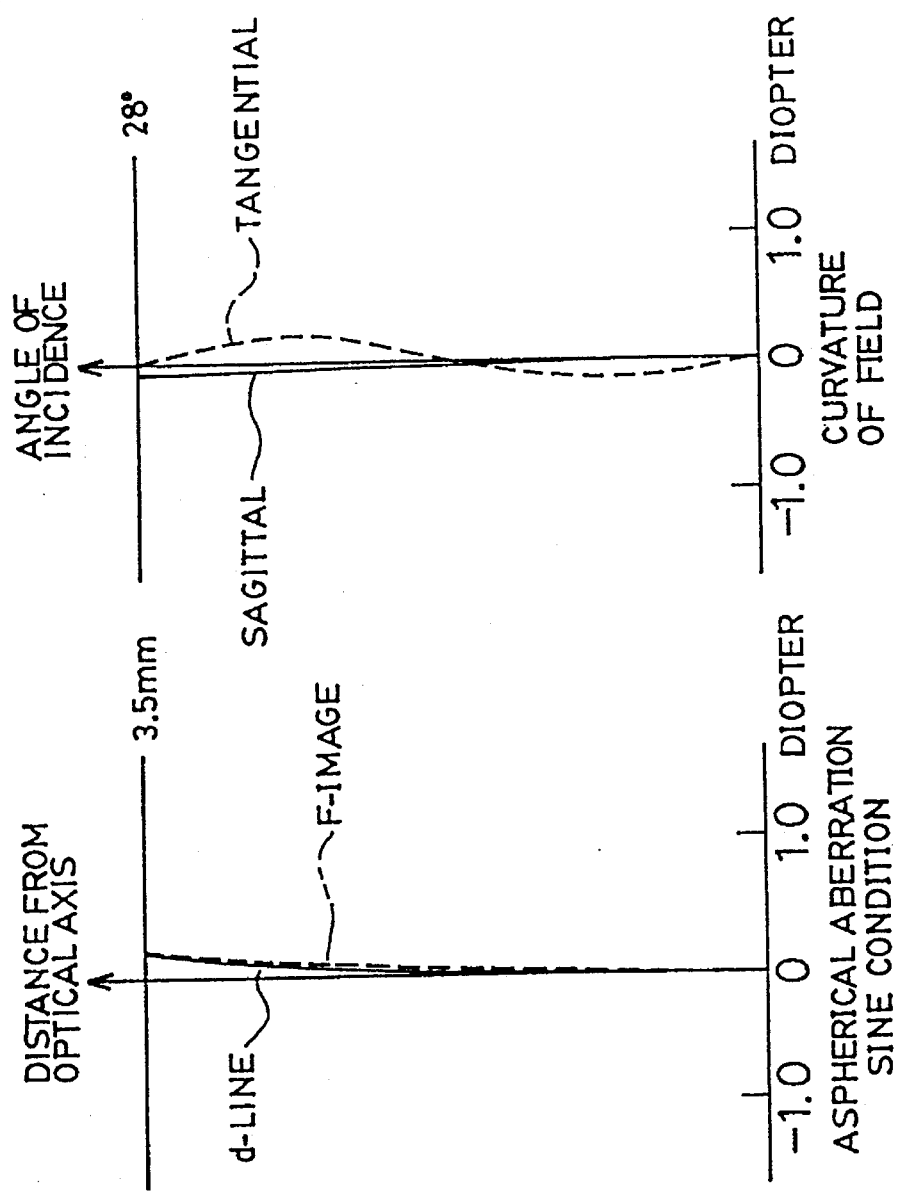
FIGS. 3A–3C are diagrammatic views showing various aberrations of the finder lens system in accordance with another preferred embodiment of the present invention.
Figure 3B:
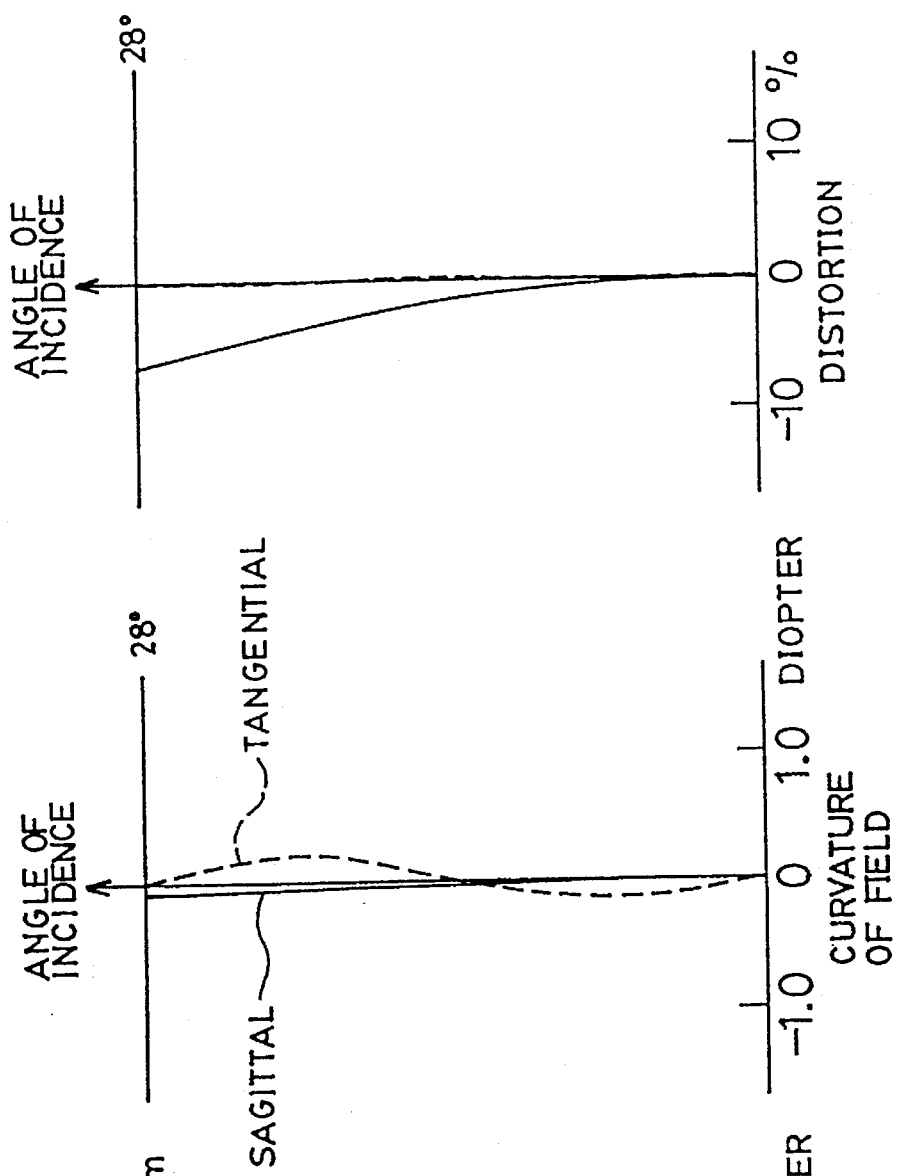
Figure 3C:
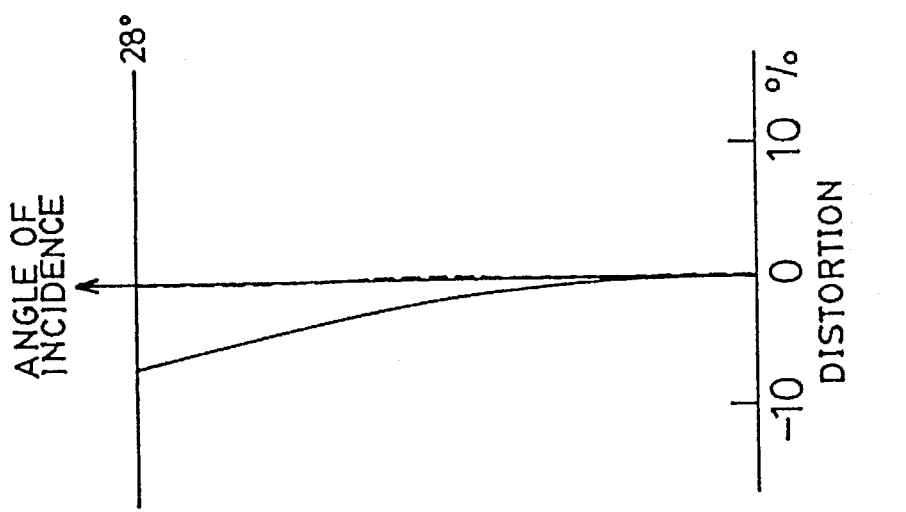

Referring now to the drawings and, in particular to FIG. 1 showing an lens system 10 of an Albada type inverted Galilean finder (which is hereafter refereed to as a finder for simplicity) of the present invention, the lens system 10 includes a concave objective lens element L1 having a negative power and a convex eyepiece element L2. The objective lens element L1, which is exemplary of a bi-concave lens having a concave surface S1 on the object side and a concave surface S2 on the pupil side which is referred to the side of a pupil LP opposite the object side of the finder lens system 10. The pupil side concave surface S2 of the objective lens element L1 is provided with a half mirror coating formed thereon by, for instance, vapor vacuum deposition. The eyepiece element L2, which is exemplary of a plano-convex lens having a flat surface S3 on the object side and a steep convex surface S4 on the pupil side. The eyepiece element L2 is provided on its object side flat surface S3 with a rectangular framing marking or framing markings (not shown) for defining a rectangular area for framing and/or a target marking (not shown) at the center of the rectangular framing area for defining an area for focusing. These markings may be of metal coatings formed by vacuum vapor deposition, or otherwise formed as a reflective markings.

A finder lens system 10 embodying the present invention may preferably has aspherical surfaces, one on each of the two lens elements L1 and L2, as will be made apparent from the examples in the following tables. The aspherical surface may be defined by the following equation:

$$X = \frac{Cy^2}{1 + (1 - KC^2y^2)^{1/2}} + a_1 y^4 + a_2 y^6 + a_3 y^8 + a_4 y^{10}$$

where

X is the surface sag at a semi-aperture distance y from the optical axis A of the aspherical lens;

C is the curvature of a lens surface at the optical axis A equal to the reciprocal of the radius at the optical axis;

K is a conic constant or other surfaces of revolution; and $a_1$, $a_2$, $a_3$ and $a_4$ are aspherical constants.

The following examples in Tables I–III are exemplary of finder lens systems of an Albada type inverted Galilean finder embodying the present invention. The finder lens systems of Tables I–III have surfaces defined by the foregoing aspheric equation. In the following prescription tables, the reference L followed by an arabic numeral indicates the lens elements progressively from the object side to the pupil side of the finder lens system 10 and the surface radius R denoted by S followed by the surface number is the radius at the optical axis A. Negative radii of the lens surfaces are struck from the left of the lens surface on the optical axis. Positive radius of the lens surface is struck from the right of the lens surface on the optical axis. $N_d$ is the index of refraction and $V_d$ is the Abbe number.

EXAMPLE I

TABLE I

| Element | | Radius of Curvature (mm) | Axial Distance Between Surfaces (mm) | $N_d$ | $V_d$ |
|---|---|---|---|---|---|
| L1 | S1 | R1 = −421.982 | | | |
| | | | 2.2 | 1.492 | 57.6 |
| | S2 | R2 = 41.000 | | | |
| | | | 16.0 | | |
| L2 | S3 | R3 = ∞ | | | |
| | | | 2.8 | 1.492 | 57.6 |
| | S4 | R4 = −50.925 | | | |
| | | | 15.0 | | |
| Pupil | | | | | |

| | Aspherical Surfaces S1 and S4 Aspherical Coefficients and Conic Constant: | | | | | |
|---|---|---|---|---|---|---|
| Surface | C | K | $a_1$ | $a_2$ | $a_3$ | $a_4$ |
| S1 | −0.002370 | −4.00 | 0.0 | −0.61062 × $10^{-7}$ | 0.37801 × $10^{-9}$ | −0.75484 × $10^{-12}$ |
| S4 | −0.019637 | 1.00 | 0.44592 × $10^{-5}$ | −0.23960 × $10^{-6}$ | 0.62213 × $10^{-8}$ | −0.50736 × $10^{-10}$ |

EXAMPLE II

TABLE II

| Element | | Radius of Curvature (mm) | Axial Distance Between Surfaces (mm) | $N_d$ | $V_d$ |
|---|---|---|---|---|---|
| L1 | S1 | R1 = −399.369 | | | |
| | | | 2.2 | 1.492 | 57.6 |
| | S2 | R2 = 38.670 | | | |
| | | | 15.0 | | |
| | S3 | R3 = ∞ | | | |
| L2 | | | 2.8 | 1.492 | 57.6 |
| | S4 | R4 = −47.774 | | | |
| | | | 15.0 | | |
| Pupil | | | | | |

Aspherical Surfaces S1 and S4
Aspherical Coefficients and Conic Constant:

| Surface | C | K | $a_1$ | $a_2$ | $a_3$ | $a_4$ |
|---|---|---|---|---|---|---|
| S1 | −0.002504 | −8.0568 | 0.0 | $-0.1265 \times 10^{-6}$ | $0.9160 \times 10^{-9}$ | $-0.2181 \times 10^{-12}$ |
| S4 | −0.019637 | 1.00 | $0.4542 \times 10^{-5}$ | $-0.9134 \times 10^{-6}$ | $0.2569 \times 10^{-7}$ | $-0.2329 \times 10^{-9}$ |

EXAMPLE III

TABLE III

| Element | | Radius of Curvature (mm) | Axial Distance Between Surfaces (mm) | $N_d$ | $v_d$ |
|---|---|---|---|---|---|
| L1 | S1 | R1 = 251.488 | | | |
| | | | 2.2 | 1.492 | 57.6 |
| | S2 | R2 = 41.500 | | | |
| | | | 17.0 | | |
| | S3 | R3 = ∞ | | | |
| L2 | | | 2.8 | 1.492 | 57.6 |
| | S4 | R4 = −67.016 | | | |
| | | | 15.0 | | |
| Pupil | | | | | |

Aspherical Surfaces S1 and S4
Aspherical Coefficients and Conic Constant:

| Surface | C | K | $a_1$ | $a_2$ | $a_3$ | $a_4$ |
|---|---|---|---|---|---|---|
| S1 | 0.003979 | −8.0568 | 0.0 | $-0.7233 \times 10^{-7}$ | $0.4853 \times 10^{-9}$ | $-0.1056 \times 10^{-11}$ |
| S4 | −0.014922 | 1.0000 | $0.4273 \times 10^{-5}$ | $-0.7178 \times 10^{-6}$ | $0.2363 \times 10^{-7}$ | $-0.2443 \times 10^{-9}$ |

The finder lens systems of Tables I–III respectively have the specific values described as follows:

| Value | EXAMPLE I | EXAMPLE II | EXAMPLE III |
|---|---|---|---|
| $f_2/L$ | 4.93 | 4.885 | 6.16 |
| $R_2/d_2$ | 2.56 | 2.578 | 2.44 |
| $R_2/|d_4|$ | 0.805 | 0.809 | 0.619 |
| Finder Magnification | 0.812 | 0.812 | 0.849 |
| Angle of View (°C.) | 28.0 | 28.0 | 27.0 |
| Overall Length (mm) | 21.0 | 20.0 | 22.0 |

As apparent from the above table, all of the finder lens systems of Tables I–III satisfy the foregoing conditions (1), (2) and (3).

FIGS. 2A–2C, 3A–3C and 4A–4C illustrate various optical characteristics, namely (A) sine condition and spherical aberration, (B) curvature of field and (C) distortion, of the finder lens systems of Tables I–III, respectively.

The Albada type inverted Galilean finder for a camera of present invention, which basically comprises a simple finder lens system comprising only two lens elements, is not only produced at low cost but also provides high finder magnifications between 0.8 and 0.85 and a wide angle of the field of view. Furthermore, it provides well corrected aberration characteristics and a clear finder image consequently.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, all embodiments of the invention and modifications to the disclosed embodiments which are within the scope and spirit of the invention are intended to be covered by the following claims.

What is claimed is:

1. An Albada type inverted Galilean finder lens system for a camera, comprising:

an objective lens element of negative power having a concave surface on a pupil side opposite an object side which is provided thereon with a half mirror coating; and an eyepiece element having a convex surface on said pupil side and a surface on said object side which is provided thereon with a framing marking defining an area for framing;

said finder lens system satisfying the following conditions:

(1) $4.0 < f_2/L < 7.0$
(2) $2.0 < R_2/d_2 < 2.7$
(3) $0.5 < R_2/|R_4| < 2.7$ where L is the overall length of said finder lens system;

$R_2$ is the radius of said concave surface of said objective lens element;

$R_4$ is the radius of said convex surface of said eyepiece;

$f_2$ is the focal length of said eyepiece element; and $d_2$ is the axial distance between said objective lens element and said eyepiece element.

2. An Albada type inverted Galilean finder lens system as defined in claim 1, wherein said objective lens element comprises a single bi-concave lens having an aspherical concave surface on said object side and said eyepiece element comprises a single plano-convex lens having an aspherical convex surface on said pupil side, said aspherical surfaces being defined by the following equation:

$$X = \frac{Cy^2}{1 + (1 - KC^2y^2)^{1/2}} + a_1y^4 + a_2y^6 + a_3y^8 + a_4y^{10}$$

where X is the surface sag at a semi-aperture distance y from the optical axis of the aspherical lens, C is the curvature of a lens surface at the optical axis equal to the reciprocal of the radius at the optical axis; K is a conic constant, and $a_1$, $a_2$, $a_3$ and $a_4$ are aspherical constants.

3. An Albada type inverted Galilean finder lens system as defined in claim 2 described substantially as follows:

| Element | | Radius of Curvature (mm) | Axial Distance Between Surfaces (mm) | $N_d$ | $V_d$ |
|---|---|---|---|---|---|
| L1 | S1 | −421.982 | | | |
| | | | 2.2 | 1.492 | 57.6 |
| | S2 | 41.000 | | | |
| | | | 16.0 | | |
| L2 | S3 | ∞ | | | |
| | | | 2.8 | 1.492 | 57.6 |
| | S4 | −50.925 | | | |
| | | | 15.0 | | |
| | Pupil | | | | |

| | Aspherical Surfaces S1 and S4 Aspherical Coefficients and Conic Constant: | | | | | |
|---|---|---|---|---|---|---|
| Surface | C | K | $a_1$ | $a_2$ | $a_3$ | $a_4$ |
| S1 | −0.002370 | −4.00 | 0.0 | −0.61062 × $10^{-7}$ | 0.37801 × $10^{-9}$ | −0.75484 × $10^{-12}$ |
| S4 | −0.019637 | 1.00 | 0.44592 × $10^{-5}$ | −0.23960 × $10^{-6}$ | 0.62213 × $10^{-8}$ | −0.50736 × $10^{-10}$ | where $N_d$ is the index of refraction of the lens elements, $V_d$ is the Abbe number, L1 and L2 are lens elements progressively from the object side to the pupil side, S1–S4 are is successive lens surfaces from the object side to the pupil side, the surfaces where negative are on radii struck from the left and where positive are on struck from the right, and surfaces S1 and S4 are aspherical as shown.

4. An Albada type inverted Galilean finder lens system as defined in claim 2 described substantially as follows:

| Element | | Radius of Curvature (mm) | Axial Distance Between Surfaces (mm) | $N_d$ | $V_d$ |
|---|---|---|---|---|---|
| L1 | S1 | −399.369 | | | |
| | | | 2.2 | 1.492 | 57.6 |
| | S2 | 38.670 | | | |
| | | | 15.0 | | |
| L2 | S3 | ∞ | | | |
| | | | 2.8 | 1.492 | 57.6 |
| | S4 | −47.774 | | | |
| | | | 15.0 | | |
| | Pupil | | | | |

-continued

Aspherical Surfaces S1 and S4
Aspherical Coefficients and Conic Constant:

| Surface | C | K | $a_1$ | $a_2$ | $a_3$ | $a_4$ |
|---|---|---|---|---|---|---|
| S1 | −0.002504 | −8.0568 | 0.0 | $-0.1265 \times 10^{-6}$ | $0.9160 \times 10^{-9}$ | $-0.2181 \times 10^{-12}$ |
| S4 | −0.019637 | 1.00 | $0.4542 \times 10^{-5}$ | $-0.9134 \times 10^{-6}$ | $0.2569 \times 10^{-7}$ | $-0.2329 \times 10^{-9}$ | where $N_d$ is the index of refraction of the lens elements, $V_d$ is the Abbe number, L1 and L2 are lens elements progressively from the object side to the pupil side, S1–S4 are is successive lens surfaces from the object side to the pupil side, the surfaces where negative are on radii struck from the left and where positive are on struck from the right, and surfaces S1 and S4 are aspherical as shown.

5. An Albada type inverted Galilean finder lens system as defined in claim 2 described substantially as follows:

| Element | | Radius of Curvature (mm) | Axial Distance Between Surfaces (mm) | $N_d$ | $v_d$ |
|---|---|---|---|---|---|
| L1 | S1 | 251.488 | | | |
| | | | 2.2 | 1.492 | 57.6 |
| | S2 | 41.500 | | | |
| | | | 17.0 | | |
| L2 | S3 | ∞ | | | |
| | | | 2.8 | 1.492 | 57.6 |
| | S4 | −67.016 | | | |
| | | | 15.0 | | |
| | Pupil | | | | |

Aspherical Surfaces S1 and S4
Aspherical Coefficients and Conic Constant:

| Surface | C | K | $a_1$ | $a_2$ | $a_3$ | $a_4$ |
|---|---|---|---|---|---|---|
| S1 | 0.003979 | −8.0568 | 0.0 | $-0.7233 \times 10^{-7}$ | $0.4853 \times 10^{-9}$ | $-0.1056 \times 10^{-11}$ |
| S4 | −0.014922 | 1.0000 | $0.4273 \times 10^{-5}$ | $-0.7178 \times 10^{-6}$ | $0.2363 \times 10^{-7}$ | $-0.2443 \times 10^{-9}$ | where $N_d$ is the index of refraction of the lens elements, $V_d$ is the Abbe number, L1 and L2 are lens elements progressively from the object side to the pupil side, S1–S4 are is successive lens surfaces from the object side to the pupil side, the surfaces where negative are on radii struck from the left and where positive are on struck from the right, and surfaces S1 and S4 are aspherical as shown.

* * * * *